US012709267B2

(12) United States Patent
Ko

(10) Patent No.: US 12,709,267 B2

(45) Date of Patent: Aug. 18, 2026

(54) METHOD OF CONTROLLING VEHICLE SAFETY DEVICE

(71) Applicant: HYUNDAI MOBIS CO., LTD., Seoul (KR)

(72) Inventor: Kwang Lim Ko, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 24 days.

(21) Appl. No.: 18/931,716

(22) Filed: Oct. 30, 2024

(65) Prior Publication Data

US 2025/0296555 A1 Sep. 25, 2025

(30) Foreign Application Priority Data

Mar. 21, 2024 (KR) ........................ 10-2024-0038992

(51) Int. Cl.

| | |
|---|---|
| ***B60W 30/09*** | (2012.01) |
| ***B60N 2/02*** | (2006.01) |
| ***B60N 2/20*** | (2006.01) |
| ***B60W 10/20*** | (2006.01) |
| ***B60W 10/30*** | (2006.01) |
| ***B60W 30/08*** | (2012.01) |
| ***B60W 30/085*** | (2012.01) |
| ***B60W 30/095*** | (2012.01) |
| ***E05F 15/72*** | (2015.01) |

(52) U.S. Cl.

CPC ........... *B60W 30/09* (2013.01); *B60N 2/0276* (2013.01); *B60N 2/20* (2013.01); *B60W 10/20* (2013.01); *B60W 10/30* (2013.01); *B60W 30/085* (2013.01); *B60W 30/095* (2013.01); *E05F 15/72* (2015.01); *E05Y 2900/542* (2013.01); *E05Y 2900/55* (2013.01)

(58) Field of Classification Search

CPC ...... B60W 30/09; B60W 10/20; B60W 10/30; B60W 30/085; B60W 30/095; B60W 30/0953; B60W 30/0956; B60W 30/08; E05F 15/72; B60N 2/0276; B60N 2/20; E05Y 2900/542; E05Y 2900/55

See application file for complete search history.

(56) References Cited

U.S. PATENT DOCUMENTS

2011/0218713 A1* 9/2011 Hashimoto .......... B60N 2/0276 701/1

2013/0073149 A1* 3/2013 Schoerrig ........... B60R 21/0134 701/45

2014/0028008 A1* 1/2014 Stadler .................. B62D 1/192 280/777

* cited by examiner

*Primary Examiner* — Jacob M Amick

(74) *Attorney, Agent, or Firm* — NSIP Law

(57) ABSTRACT

A method of controlling a vehicle safety device including predicting, by a controller, a collision accident and a rollover accident by using a signal detected by an accident prediction detecting part installed in a host vehicle and supporting, responsive to a prediction of an accident of the host vehicle, by the controller, a passenger, the passenger being situated in a seat in the host vehicle, to remain on the seat by operating a seat device, the seat device being configured to support the passenger on the seat, while closing an opening/closing device, the opening/closing device being configured to openably and closably operate at a periphery of the passenger.

16 Claims, 5 Drawing Sheets

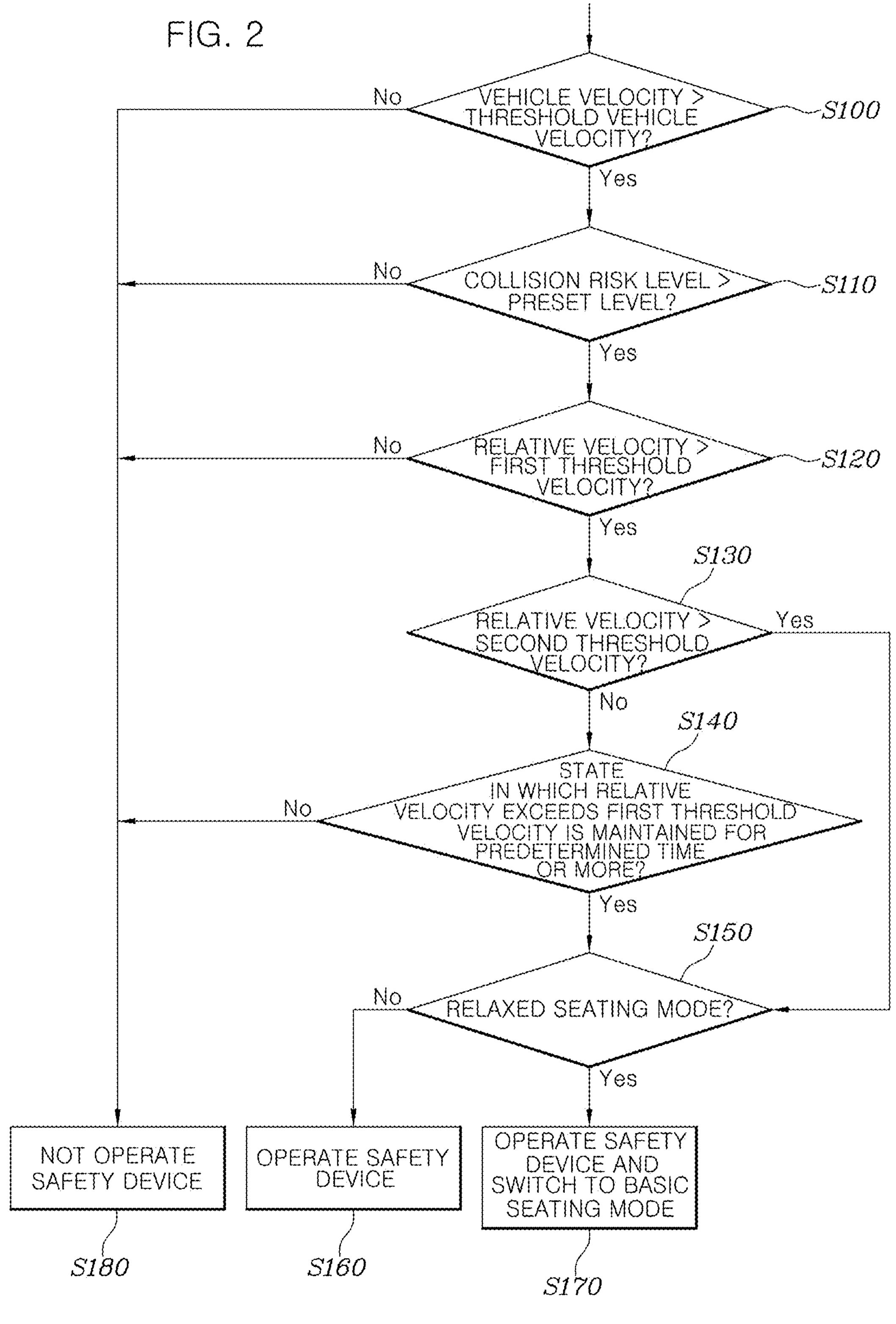
FIG. 2
VEHICLE VELOCITY > THRESHOLD VEHICLE VELOCITY?
S100
No
Yes
COLLISION RISK LEVEL > PRESET LEVEL?
S110
No
Yes
RELATIVE VELOCITY > FIRST THRESHOLD VELOCITY?
S120
No
Yes
S130
RELATIVE VELOCITY > SECOND THRESHOLD VELOCITY?
Yes
No
S140
STATE IN WHICH RELATIVE VELOCITY EXCEEDS FIRST THRESHOLD VELOCITY IS MAINTAINED FOR PREDETERMINED TIME OR MORE?
No
Yes
S150
RELAXED SEATING MODE?
No
Yes
NOT OPERATE SAFETY DEVICE
OPERATE SAFETY DEVICE
OPERATE SAFETY DEVICE AND SWITCH TO BASIC SEATING MODE
S180
S160
S170

FIG. 3

METHOD OF CONTROLLING VEHICLE SAFETY DEVICE

CROSS-REFERENCE TO RELATED APPLICATION

The present application claims priority under 35 USC § 119(a) of Korean Patent Application No. 10-2024-0038992 filed on Mar. 21, 2024, the entire contents of which are incorporated herein for all purposes.

BACKGROUND

1. Field

The present disclosure relates to a method of controlling a vehicle safety device, which is capable of actively protecting a passenger by controlling operations of devices in a vehicle, which affect an injury to the passenger, by predicting a collision situation of the vehicle and determining a posture of the passenger.

2. Description of the Related Art

In the event of a collision of a vehicle, the collision is detected by an acceleration sensor and a pressure sensor that are passive sensors, and an airbag and a seatbelt pretensioner are deployed on the basis of data transmitted to an airbag control unit (ACU).

Because this technology operates a passenger protection device only when a collision occurs, there is a problem in that it is impossible to prepare for a collision in advance.

In particular, in a situation in which vehicle interior structures and passenger seating postures are expected to be diversified in accordance with the development of autonomous driving technologies, it may be difficult to sufficiently ensure the safety of the passengers by using the protection technology.

The foregoing explained as the background is intended merely to aid in the understanding of the background of the present disclosure, and is not intended to mean that the present disclosure falls within the purview of the related art that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a method including predicting, by a controller, a collision accident and a rollover accident by using a signal detected by an accident prediction detecting part installed in a host vehicle and supporting, responsive to a prediction of an accident of the host vehicle, by the controller, a passenger, the passenger being situated in a seat in the host vehicle, to remain on the seat by operating a seat device, the seat device being configured to support the passenger on the seat, while closing an opening/closing device, the opening/closing device being configured to openably and closably operate at a periphery of the passenger.

The predicting may include predicting a forward or rearward collision accident by determining a distance and relative velocity of the host vehicle with respect to vehicles traveling forward or rearward of the host vehicle based on the signal detected by the accident prediction detecting part.

An occurrence of a forward or rearward collision accident may be predicted by the controller when a vehicle velocity of the host vehicle exceeds a host threshold vehicle velocity, a collision risk level with a preceding or following vehicle, the collision risk level being calculated based on distances and velocities with respect to the preceding and following vehicles, exceeds a preset level, and a relative velocity with respect to the preceding or following vehicle exceeds a relative velocity threshold velocity.

The supporting may occur responsive to the relative velocity with respect to the preceding or following vehicle exceeding a first threshold velocity, and a time for which the relative velocity exceeds the first threshold velocity is greater than or equal to a predetermined time and the supporting may be immediately initiated responsive to the relative velocity with respect to the preceding or following vehicle exceeds a second threshold velocity higher than the first threshold velocity.

The predicting may include predicting a rollover accident by determining a roll motion of the host vehicle based on the signal detected by the accident prediction detecting part.

Occurrence of a rollover accident may be predicted by the controller when a vehicle velocity of the host vehicle exceeds a host threshold vehicle velocity, a roll angle of the host vehicle exceeds a threshold angle, and a roll angular velocity exceeds a threshold angular velocity.

The opening/closing device may include one or more of a window glass and a sunroof and the seat device may include one or more of a seatbelt and a bolster device.

The method may include determining, by the controller, a posture of the passenger by using a signal detected by a passenger posture detecting part installed in the host vehicle and the supporting further may include controlling a posture of the seat responsive to the posture of the passenger being determined as a tilted rearward orientation, the seat operates in a basic seating mode in which an upper body of the passenger returns forward.

The supporting may include controlling a steering wheel to position the steering wheel at a preset basic position when a forward or rearward collision accident is predicted.

The supporting may include controlling a steering wheel to move the steering wheel to one of entering a dash panel side or exiting toward a driver side from a preset basic position responsive to the forward or rearward collision accident being predicted.

BRIEF DESCRIPTION OF THE DRAWINGS

FIG. 2 is a flowchart illustrating a process of controlling an operation of the safety device when a forward or rearward collision accident of the vehicle is predicted according to the present disclosure.

FIG. 3 is a flowchart illustrating a process of controlling an operation of the safety device when a rollover accident of the vehicle is predicted according to the present disclosure.

Figure 1:
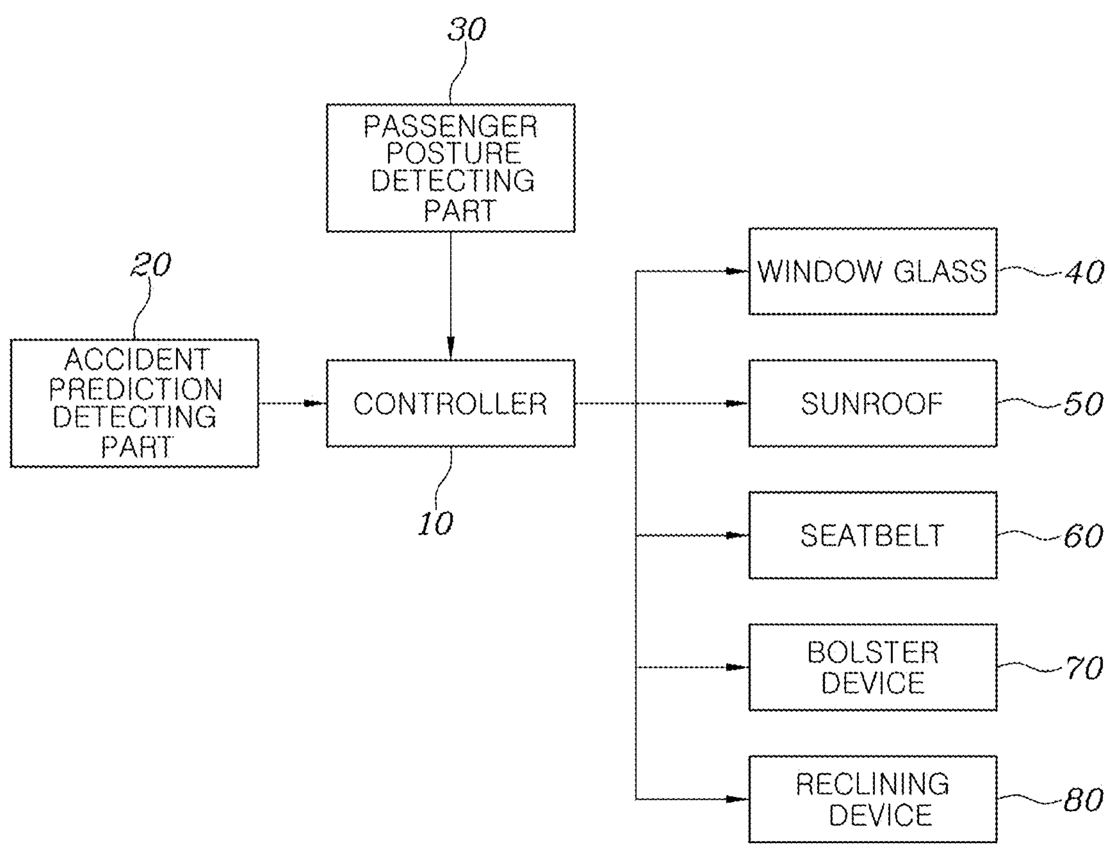
FIG. 1 is a view schematically illustrating a system configuration for controlling a vehicle safety device according to the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION OF THE DISCLOSURE

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

In addition, the term "control unit" or "unit" included in the name of "motor control unit (MCU)" or "hybrid control unit (HCU)" is merely a term widely used to name a control device (controller or control unit) for controlling a particular vehicle function but does not mean a generic function unit.

A controller may include a communication device configured to communicate with another controller or a sensor to control a corresponding function, a memory configured to store an operating system, a logic command, and input/output information, and one or more processors configured to perform determination, computation, decision, or the like required to control the corresponding function.

Hereinafter, exemplary embodiments of the present disclosure will be described in detail with reference to the accompanying drawings.

A method of controlling a vehicle safety device of the present disclosure includes an accident prediction step of predicting, by a controller 10, a collision accident and a rollover accident by using a signal detected by an accident prediction detecting part 20 installed in a host vehicle, and a safety device operation step of supporting, by the controller 10, a passenger, who is seated in a seat, on the seat by operating a seat device, which is configured to support the passenger on the seat, while closing an opening/closing device, which openably and closably operates at a periphery of the passenger, when an accident of the host vehicle is predicted.

That is, the accident prediction detecting part 20 installed in the vehicle may detect motions of other vehicles traveling at the periphery of the host vehicle and detect a traveling motion of the host vehicle. Therefore, it is possible to predict, in advance, the occurrence of an accident of the host vehicle on the basis of the detected signal.

In particular, in case that an accident of the vehicle is predicted in advance, operations of the opening/closing device and the seat device in the vehicle, which greatly affect a level of an injury to the passenger, are controlled.

That is, the opening/closing device installed at the periphery of the passenger is closed to allow the seat device to restrain the passenger's body, thereby preventing the passenger from being ejected to the outside of the vehicle through the opening/closing device in the event of an accident, preventing a risk of an injury to the passenger, and actively protecting the passenger.

Meanwhile, in the embodiment for predicting a forward or rearward collision accident of the vehicle, the accident prediction step may predict a forward or rearward collision accident of the host vehicle by determining a distance and relative velocity of the host vehicle with respect to vehicles traveling forward and rearward of the host vehicle on the basis of the signal detected by the accident prediction detecting part 20.

For example, the accident prediction detecting part 20 may be an image capturing means, such as a radar or a camera, installed in the host vehicle to capture images of front and rear sides of the host vehicle.

In addition, the accident prediction detecting parts 20 may be a forward collision-avoidance assist (FCA) system and a rear cross-traffic collision avoidance assist (RCCA) system installed at the front and rear sides of the vehicle to prevent collision with preceding and following vehicles.

Therefore, when the preceding vehicle and the following vehicle are detected by the accident prediction detecting parts 20, a detected signal (image signal) may be inputted to the controller 10, not only distances between the host vehicle and the vehicles traveling forward and rearward of the host vehicle but also relative velocities of the preceding and following vehicles that approach the host vehicle may be calculated on the basis of the inputted signal.

Further, a collision risk level may be set on the basis of the calculated distances and relative velocities between the host vehicle and the preceding and following vehicles. The collision risk level may be calculated as being high as the collision risk increases.

Therefore, as illustrated in FIG. 2, in the present disclosure, it is possible to predict that a forward or rearward collision accident will occur when a vehicle velocity of the host vehicle exceeds a threshold vehicle velocity, a collision risk level with the preceding or following vehicle, which is calculated on the basis of distances and velocities with respect to the preceding and following vehicles, exceeds a preset level, and a relative velocity with respect to the preceding or following vehicle exceeds a threshold velocity.

Specifically, the process may be controlled to enter the safety device operation step when a relative velocity with respect to the preceding or following vehicle exceeds a first threshold velocity, and the time for which the relative velocity exceeds the first threshold velocity is maintained as a predetermined time or more. Further, the process may be controlled to immediately enter the safety device operation step when a relative velocity with respect to the preceding or following vehicle exceeds a second threshold velocity higher than the first threshold velocity.

For example, the collision risk level is calculated as being low when the relative velocities of the preceding and following vehicles approaching the host vehicle are low.

However, in case that the relative velocities of the preceding and following vehicles are high, the collision risk level may be calculated as being high, such that a situation in which a forward or rearward collision may occur may be predicted.

Therefore, the safety devices, such as the opening/closing device and the seat device, are controlled to operate immediately when the relative velocity exceeds the second threshold velocity, thereby actively protecting the passenger.

However, in case that the relative velocity is higher than the first threshold velocity but does not reach the second threshold velocity, the time for which the vehicle stays in the corresponding velocity section is counted. When the counted time is a predetermined time or more, the occurrence of a forward or rearward collision accident may be predicted, such that the safety devices such as the opening/closing device and the seat device may be controlled to operate.

Meanwhile, in the embodiment for predicting a rollover accident of the vehicle, the accident prediction step may predict a rollover accident by determining a roll motion of the host vehicle on the basis of a signal detected by the accident prediction detecting part 20.

For example, the accident prediction detecting part 20 may be a sensor installed in the host vehicle to detect a roll motion of the host vehicle.

Therefore, when a rolling motion of the host vehicle is detected by the accident prediction detecting part 20, a detected signal may be inputted to the controller 10, and an unstable roll motion of the host vehicle may be detected on the basis of the inputted signal, such that a risk of a rollover accident of the host vehicle may be predicted.

Figure 3:
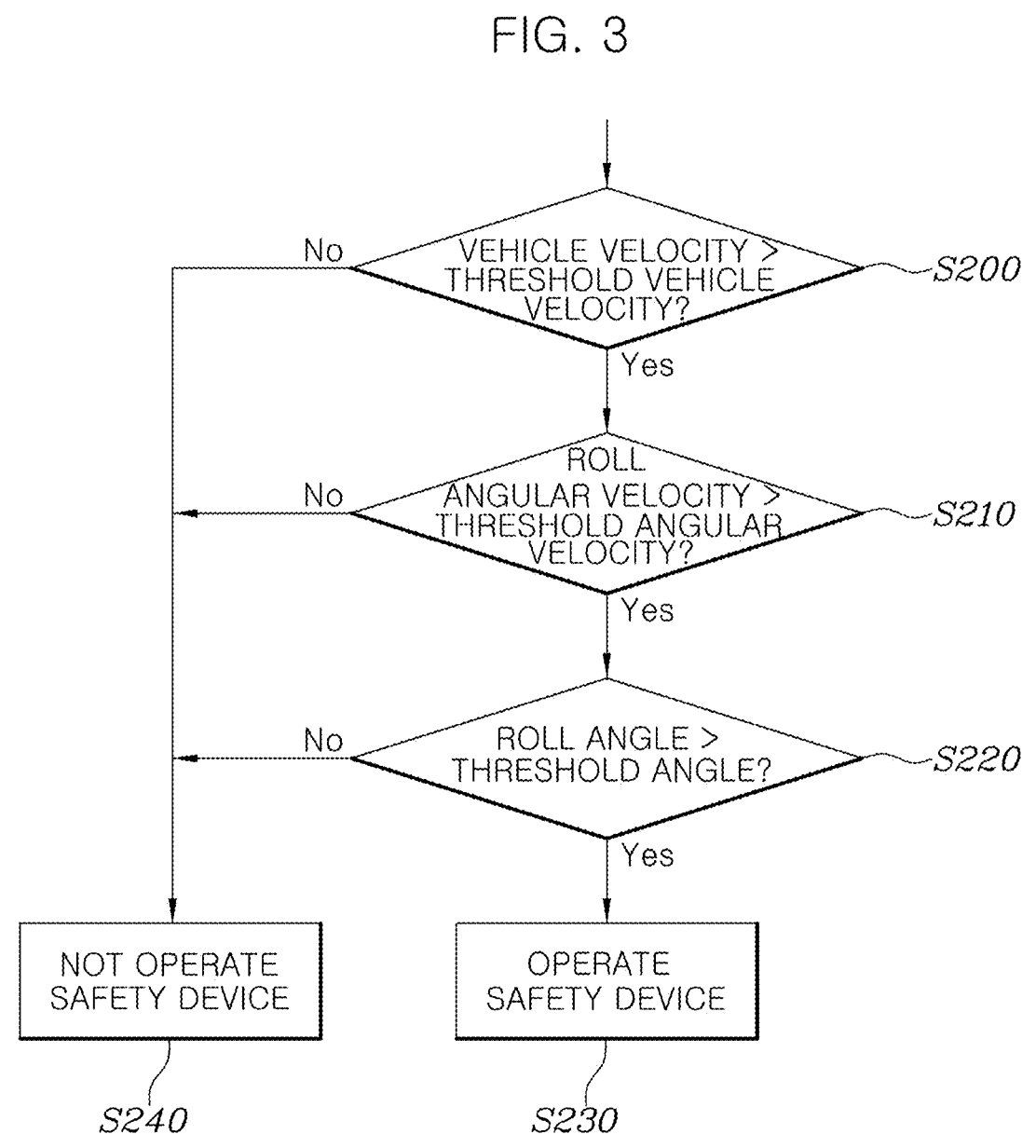

Therefore, as illustrated in FIG. 3, in the present disclosure, it is possible to predict that a rollover accident will occur when a vehicle velocity of the host vehicle exceeds a threshold vehicle velocity, a roll angle of the host vehicle exceeds a threshold angle, and a roll angular velocity exceeds a threshold angular velocity.

For example, a risk of a rollover accident is low in case that a roll motion of the host vehicle is stable. However, in case that a roll motion, which is based on the roll angular velocity and the roll angle, is biased to one side and unstable, a risk of a rollover accident increases.

Therefore, when the roll angular velocity and the roll angle in the same direction exceed the threshold values, the safety devices, such as the opening/closing device and the seat device, are controlled to operate, thereby actively protecting the passenger.

In the present disclosure, the opening/closing device may be any one of or both a window glass 40 and a sunroof 50.

That is, in case that a forward or rearward collision accident or a rollover accident of the vehicle is predicted, the side window glass is controlled to be moved upward and closed.

Further, the sunroof 50 is also controlled to be closed.

Further, in the present disclosure, the seat device may be any one of or both a seatbelt 60 and a bolster device 70.

That is, in case that a forward or rearward collision accident or a rollover accident of the vehicle is predicted, a seatbelt pretensioner or the like is controlled to operate so that the seatbelt 60 is tightened around the passenger's body.

Further, the bolster device 70 installed in the seat is controlled to be expanded so that the bolster device 70 is also tightened around the passenger's body.

Therefore, in the event of an accident of the vehicle, the seatbelt 60 and the bolster device 70 restrain the passenger's body in the seat, and the window glass 40 and the sunroof 50 are closed, which may basically prevent the passenger from being ejected to the outside of the vehicle, thereby more safely protecting the passenger.

For reference, the safety devices, such as the window glass 40, the sunroof 50, the seatbelt 60, and the bolster device 70, are operated individually for each device by operations of actuators.

Therefore, the controller 10 may provide operational instruction signals directly to the actuator. Alternatively, a sub-controller may be provided in each of the actuators, and the controller 10 may perform control to operate the actuators by providing operational instruction signals to the sub-controllers.

Meanwhile, the method of the present disclosure may further include a posture determination step of determining, by the controller 10, a posture of the passenger on the basis of a signal detected by a passenger posture detecting part 30 installed in the host vehicle.

Therefore, the safety device operation step further includes a step of controlling a posture of the seat in accordance with the posture of the passenger so that when it is determined that the passenger's upper body is tilted rearward, the seat operates in a basic seating mode in which the passenger's upper body returns forward.

Specifically, the passenger posture detecting part 30 may be an image capturing means, such as a camera, installed in an occupant compartment and configured to capture images of the interior.

Therefore, images of the bodies of the passengers in the driver seat and the auxiliary seat may be captured by the passenger posture detecting part 30 and monitored at ordinary times, and the posture of the passenger may be determined by inputting the captured images of the passenger's body to a deep learning AI network.

For example, 2D and 3D positions of body main joints may be estimated from the captured images of the passenger's body, and the seating posture of the passenger may be determined on the basis of the estimated position.

Figure 4:
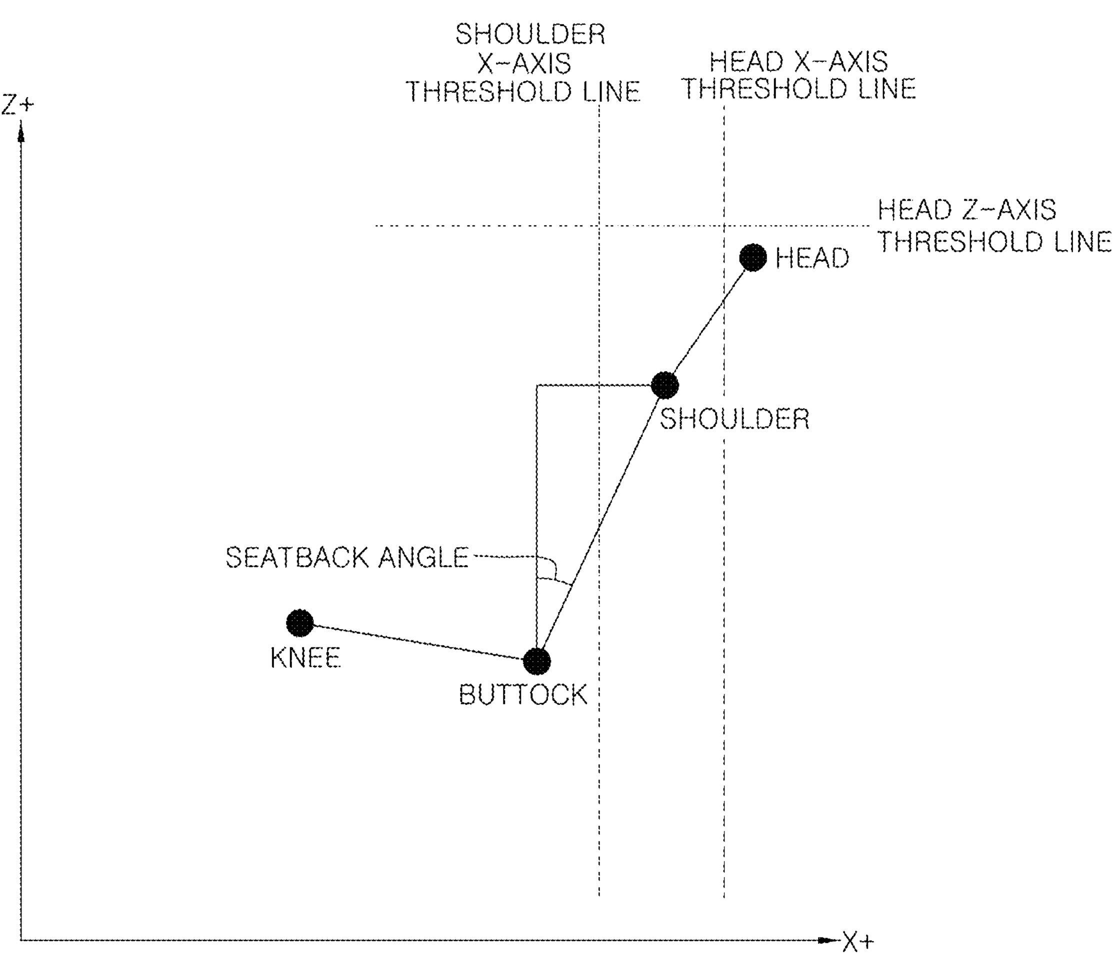
FIG. 4 is a view for explaining a technical means for recognizing a seating posture of a passenger according to the present disclosure.

In FIG. 4, an X-axis indicates a forward/rearward direction of the vehicle, and a Z-axis indicates an upward/downward direction of the vehicle. FIG. 4 is a view illustrating that positions of a head, a shoulder, a buttock, and a knee of a passenger are estimated among body parts visible from a lateral side of the passenger.

The drawing illustrates that an X-axis position of the passenger's head exceeds an X-axis threshold line in a (+) direction, a Z-axis position of the passenger's head exceeds a Z-axis threshold line in the (+) direction, and an X-axis position of the passenger's shoulder exceeds the X-axis threshold line in the (+) direction.

Further, a seatback angle is detected by a seat position sensor, and whether the detected seatback angle exceeds a threshold angle is determined.

Therefore, in case that the seatback angle exceeds the threshold angle when a condition in which the passenger's body parts exceed the respective threshold lines is satisfied, it may be determined that the passenger is seated in the seat in a relaxed seating mode.

As described above, in case that a forward or rearward collision accident of the vehicle is predicted in the state in which the relaxed seating mode is determined, the seatback angle is restored into a preset basic angle range by a reclining device 80, such that the seating posture of the passenger is changed from the relaxed seating mode to the basic seating mode.

Of course, even in the relaxed seating mode, the opening/closing device and the seat device are operated.

Therefore, a collision situation of the vehicle may be predicted, and the operation of the safety device, which affects an injury to the passenger, may be controlled, such that a risk of an injury to the passenger may be prevented. In particular, the posture of the passenger in the relaxed seating state may be switched to the basic seating posture, which prevents a submarine phenomenon of the passenger.

For reference, the above-mentioned algorithm for determining the posture of the passenger is an example of an algorithm for determining the posture of the passenger. For example, in addition to the above-mentioned algorithm, other algorithms may be applied to determine the posture of the passenger.

Further, in the present disclosure, the safety device operation step may further include a step of controlling a steering wheel to position the steering wheel at a preset basic position when a forward collision accident or a rearward collision accident is predicted.

As an exemplary example, the safety device operation step may further include a step of controlling the steering wheel, the steering wheel being in a state in which the steering wheel enters a dash panel side or exits toward a driver side from the reset basic position, to position the steering wheel to the basic position when a forward collision accident or a rearward collision accident is predicted.

That is, before the passenger's body is moved forward or rearward by the forward or rearward collision of the vehicle, an airbag needs to be deployed so that the passenger is restrained by the fully deployed airbag.

Therefore, the steering wheel is moved to adjust a distance between the passenger and the steering wheel in order to ensure the time for which the passenger in the driver seat may be stably restrained by an airbag cushion mounted in the steering wheel after the occurrence of a collision.

For example, in case that the steering wheel is positioned in the state in which the steering wheel exits toward the driver side from the preset basic position in the event of a forward or rearward collision accident of the vehicle, the steering wheel enters the dash panel side by a telescopic operation of the steering wheel, such that the steering wheel is positioned at the basic position.

Therefore, the airbag cushion may be deployed at the optimal time so that the driver does not collide with the steering wheel and the driver's upper body may be safely loaded onto the airbag cushion and restrained.

On the contrary, in case that the steering wheel is positioned in the state in which the steering wheel enters the dash panel side from the preset basic position in the event of a forward or rearward collision accident of the vehicle, the steering wheel exits toward the driver side by the telescopic operation of the steering wheel, such that the steering wheel is positioned at the basic position.

Therefore, the airbag cushion may be deployed at the optimal time so that the driver's upper body may be safely loaded onto the airbag cushion and restrained.

Hereinafter, a flow of a control process of operating the vehicle safety device according to the present disclosure will be exemplarily described.

Information on the vehicle velocity may be inputted to the controller 10, and the controller 10 may determine the vehicle velocity. Information detected by the accident prediction detecting part 20 may be inputted to the controller 10, and the controller 10 may determine the collision risk level. Information detected by the seat position sensor and the passenger posture detecting part 30 may be inputted to the controller 10, and the controller 10 may determine the posture of the passenger. On the basis of the inputted information, the controller 10 predicts a forward or rearward collision situation by monitoring surrounding situations of the vehicle and the motion of the vehicle at ordinary times while the vehicle travels.

With reference to FIG. 1, during the process of monitoring the vehicle, whether the vehicle velocity of the host vehicle exceeds the threshold vehicle velocity is determined (S100).

When the determination result in step S100 indicates that the vehicle velocity exceeds the threshold vehicle velocity, the collision risk level of the vehicle, which approaches the front or rear side of the host vehicle, is calculated, and whether the collision risk level exceeds a preset level is determined (S110).

When the determination result in step S110 indicates that the collision risk level exceeds the preset level, whether the relative velocity exceeds the preset first threshold velocity is determined by calculating the relative velocity of the vehicle that approaches the front or rear side of the host vehicle (S120).

When the determination result in step S120 indicates that the relative velocity exceeds the first threshold velocity, whether the relative velocity exceeds the second threshold velocity higher than the first threshold velocity is determined (S130).

When the determination result in step S130 indicates that the relative velocity exceeds the second threshold velocity, whether the passenger is seated in the relaxed seating mode is determined (S150).

In contrast, in case that the relative velocity does not exceed the second threshold velocity, whether the state in which the relative velocity exceeds the first threshold velocity is maintained for a predetermined time or more is determined (S140). When the determination result indicates that the state in which the relative velocity exceeds the first threshold velocity is maintained for the predetermined time or more, the process enters step S150.

Therefore, when the determination result in step S150 indicates that the seating mode is not the relaxed seating mode, the safety devices including the opening/closing device and the seat device are operated, which prevents a risk of an injury caused when the passenger is ejected to the outside of the vehicle in a collision situation (S160).

In addition, in case that the position of the steering wheel deviates from the preset basic position, the steering wheel may be controlled to operate so that the steering wheel is positioned at the preset basic position.

In contrast, when the determination result in step S150 indicates that the seating mode is the relaxed seating mode, the safety device operates to prevent a risk of an injury caused when the passenger is ejected to the outside of the vehicle in a collision situation. Meanwhile, the seatback, which is tilted rearward, is changed to the basic seating mode by the operation of the reclining device 80, which prevents a submarine phenomenon in which the passenger's lower limbs slip toward the lower side of the seatbelt 60 (S170).

Even in this case, in case that the position of the steering wheel deviates from the preset basic position, the steering wheel may be controlled to operate so that the steering wheel is positioned at the preset basic position.

For reference, when the determination results in steps S100, S110, S120, and S140 indicate that the corresponding conditions are not satisfied, the safety device does not operate because this situation is not the situation in which a forward or rearward collision accident is likely to occur (S180).

Figure 5:
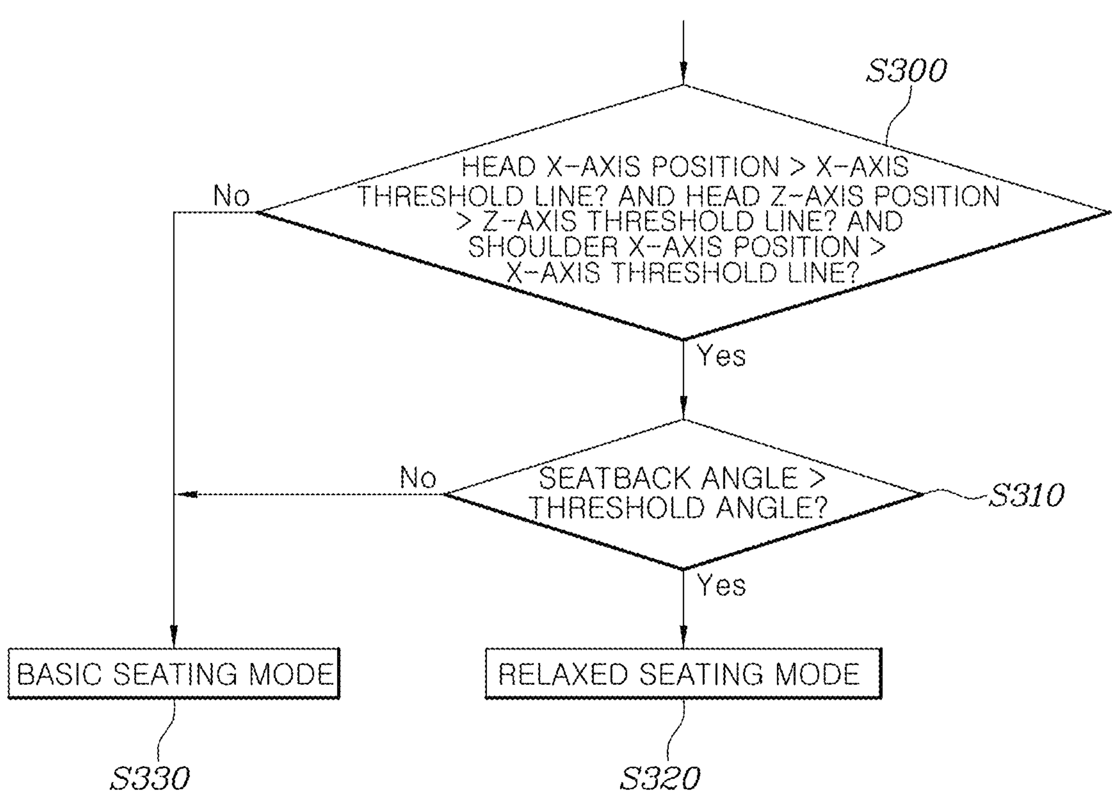
FIG. 5 is a flowchart illustrating a process of recognizing a seating posture of a passenger by the technical means in FIG. 4.

Meanwhile, FIG. 5 illustrates a control flow for determining a seating state in the relaxed seating mode.

With reference to the drawings, it is determined whether the X-axis position of the passenger's head exceeds the X-axis threshold line in the (+) direction, the Z-axis position of the passenger's head exceeds the Z-axis threshold line in the (+) direction, and the X-axis position of the passenger's shoulder exceeds the X-axis threshold line in the (+) direction (S300).

When the conditions in step S300 are satisfied, whether the seatback angle exceeds the threshold angle is determined (S310).

When the determination result in step S310 indicates that the seatback angle exceeds the threshold angle, the seating mode is determined as the relaxed seating mode (S320).

In contrast, the determination results in steps S300 and S310 indicate that the corresponding conditions are not satisfied, the seating mode is determined as the basic seating mode (S330).

Meanwhile, the vehicle velocity may be determined as the information on the vehicle velocity is inputted to the controller 10, and the roll motion of the host vehicle may be determined as information detected by the accident prediction detecting part 20 is inputted. On the basis of the inputted information, the controller 10 predicts a rollover accident by monitoring the motion of the vehicle at ordinary times while the vehicle travels.

With reference to FIG. 3, during the process of monitoring the vehicle, whether the vehicle velocity of the host vehicle exceeds the threshold vehicle velocity is determined (S200).

When the determination result in step S200 indicates that the vehicle velocity exceeds the threshold vehicle velocity, whether a roll angular velocity of the vehicle exceeds a threshold angular velocity is determined (S210).

In case that the determination result in step S210 indicates that the roll angular velocity exceeds the threshold angular velocity, whether a roll angle of the vehicle exceeds the threshold angle is determined (S220).

Therefore, when the determination result in step S220 indicates that the roll angle exceeds the threshold angle, the safety devices including the opening/closing device and the seat device are operated, which prevents a risk of an injury caused when the passenger is ejected to the outside of the vehicle in a rollover accident situation (S230).

In contrast, when the determination results in steps S200, S210, and S220 indicate that the corresponding conditions are not satisfied, the safety device does not operate because this situation is not the situation in which a rollover accident is likely to occur (S240).

According to the present disclosure described above, in case that an accident of the vehicle is predicted in advance, the operation of the safety device in the vehicle, which greatly affects a level of an injury to the passenger, may be controlled, and the angle of the seat may be appropriately controlled in accordance with the posture of the passenger. Therefore, it is possible to prevent the passenger from being ejected to the outside of the vehicle through the opening/closing device in the event of an accident, prevent a risk of an injury to the passenger, and more actively protect the passenger.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of controlling a vehicle safety device, the method comprising:

predicting, by a controller, a collision accident and a rollover accident by using a signal detected by an accident prediction detecting part installed in a host vehicle; and supporting, responsive to a prediction of an accident of the host vehicle, by the controller, a passenger, the passenger being situated in a seat in the host vehicle, to remain on the seat by operating a seat device, the seat device being configured to support the passenger on the seat, while closing an opening/closing device, the opening/closing device being configured to openably and closably operate at a periphery of the passenger, wherein the predicting of the rollover accident comprises determining, before a rollover occurs, a roll motion of the host vehicle based on the signal detected by the accident prediction detecting part.

2. The method of claim 1, wherein the predicting further comprises:

predicting a forward or rearward collision accident by determining a distance and relative velocity of the host vehicle with respect to vehicles traveling forward or rearward of the host vehicle based on the signal detected by the accident prediction detecting part.

3. A method of controlling a vehicle safety device, the method comprising:

predicting, by a controller, a collision accident and a rollover accident by using a signal detected by an accident prediction detecting part installed in a host vehicle; and supporting, responsive to a prediction of an accident of the host vehicle, by the controller, a passenger, the passenger being situated in a seat in the host vehicle, to remain on the seat by operating a seat device, the seat device being configured to support the passenger on the seat, while closing an opening/closing device, the opening/closing device being configured to openably and closably operate at a periphery of the passenger, wherein the predicting further comprises predicting a forward or rearward collision accident by determining a distance and relative velocity of the host vehicle with respect to vehicles traveling forward or rearward of the host vehicle based on the signal detected by the accident prediction detecting part, and wherein an occurrence of a forward or rearward collision accident is predicted by the controller when a vehicle velocity of the host vehicle exceeds a host threshold vehicle velocity, a collision risk level with a preceding or following vehicle, the collision risk level being calculated based on distances and velocities with respect to the preceding and following vehicles, exceeds a preset level, and a relative velocity with respect to the preceding or following vehicle exceeds a relative velocity threshold velocity.

4. The method of claim 3, wherein the supporting occurs responsive to the relative velocity with respect to the preceding or following vehicle exceeding a first threshold velocity, and a time for which the relative velocity exceeds the first threshold velocity is greater than or equal to a predetermined time, and wherein the supporting is immediately initiated responsive to the relative velocity with respect to the preceding or following vehicle exceeds a second threshold velocity higher than the first threshold velocity.

5. The method of claim 1, wherein the predicting further comprises predicting a rollover accident by determining a roll motion of the host vehicle based on the signal detected by the accident prediction detecting part.

6. A method of controlling a vehicle safety device, the method comprising:

predicting, by a controller, a collision accident and a rollover accident by using a signal detected by an accident prediction detecting part installed in a host vehicle; and supporting, responsive to a prediction of an accident of the host vehicle, by the controller, a passenger, the passenger being situated in a seat in the host vehicle, to remain on the seat by operating a seat device, the seat device being configured to support the passenger on the seat, while closing an opening/closing device, the opening/closing device being configured to openably and closably operate at a periphery of the passenger, wherein the predicting further comprises predicting a rollover accident by determining a roll motion of the host vehicle based on the signal detected by the accident prediction detecting part, and wherein occurrence of a rollover accident is predicted by the controller when a vehicle velocity of the host vehicle exceeds a host threshold vehicle velocity, a roll angle of the host vehicle exceeds a threshold angle, and a roll angular velocity exceeds a threshold angular velocity.

7. The method of claim 1, wherein the opening/closing device comprises one or more of a window glass and a sunroof, and wherein the seat device comprises one or more of a seatbelt and a bolster device.

8. The method of claim 1, further comprising:

determining, by the controller, a posture of the passenger by using a signal detected by a passenger posture detecting part installed in the host vehicle, wherein the supporting further comprises controlling a posture of the seat responsive to the posture of the passenger being determined as a tilted rearward orientation, the seat operates in a basic seating mode in which an upper body of the passenger returns forward.

9. The method of claim 8, wherein the supporting further comprises controlling a steering wheel to position the steering wheel at a preset basic position when a forward or rearward collision accident is predicted.

10. The method of claim 8, wherein the supporting comprises controlling a steering wheel, the steering wheel being in a state in which the steering wheel enters a dash panel side or exits toward a driver side from a preset basic position, to move the steering wheel to the preset basic position, responsive to the forward or rearward collision accident being predicted.

11. The method of claim 3, wherein the accident prediction detecting part comprises one or more of a radar and a camera installed in the host vehicle and configured to capture information regarding vehicles traveling forward or rearward of the host vehicle.

12. The method of claim 8, wherein determining the posture of the passenger comprises:

estimating positions of one or more body parts of the passenger from image data captured by the passenger posture detecting part; and determining whether the passenger is in a relaxed seating mode or a basic seating mode based on the estimated positions.

13. The method of claim 12, wherein the controlling the posture of the seat comprises operating a reclining device to switch the posture of the passenger from the relaxed seating mode to the basic seating mode responsive to a prediction of a forward or rearward collision accident.

14. The method of claim 11, wherein the accident prediction detecting part comprises one or more of a forward collision-avoidance assist system configured to detect vehicles traveling forward of the host vehicle and a rear cross-traffic collision avoidance assist system configured to detect vehicles traveling rearward of the host vehicle.

15. The method of claim 12, wherein determining whether the passenger is in the relaxed seating mode comprises:

determining that the passenger is in the relaxed seating mode when an X-axis position of a head of the passenger exceeds an X-axis threshold line, a Z-axis position of the head of the passenger exceeds a Z-axis threshold line, an X-axis position of a shoulder of the passenger exceeds the X-axis threshold line, and a seatback angle of the seat exceeds a threshold angle; and determining that the passenger is in the basic seating mode when at least one of the foregoing conditions is not satisfied.

16. The method of claim 13, wherein the operating the reclining device comprises restoring a seatback angle of the seat to a preset basic angle range so as to return an upper body of the passenger to a forward-facing orientation.

* * * * *